(12) United States Patent
Lauritano et al.

(10) Patent No.: US 10,358,965 B2
(45) Date of Patent: Jul. 23, 2019

(54) UNDERFLOW SELECTIVE CATALYTIC REDUCTION STEADY STATE AMMONIA SLIP DETECTION WITH POSITIVE PERTURBATION

(71) Applicant: GM GLOBAL TECHNOLOGY OPERATIONS LLC, Detroit, MI (US)

(72) Inventors: Luca Lauritano, Turin (IT); Luis Daniel Guerrero Cruz, Turin (IT); Francesco Irlando, Turin (IT)

(73) Assignee: GM GLOBAL TECHNOLOGY OPERATIONS LLC, Detroint, MI (US)

( * ) Notice: Subject to any disclaimer, the term of this patent is extended or adjusted under 35 U.S.C. 154(b) by 61 days.

(21) Appl. No.: 15/804,054

(22) Filed: Nov. 6, 2017

(65) Prior Publication Data

US 2019/0136732 A1    May 9, 2019

(51) Int. Cl.
*F01N 3/20* (2006.01)
*B01D 53/94* (2006.01)
*F01N 11/00* (2006.01)

(52) U.S. Cl.
CPC ......... *F01N 3/208* (2013.01); *B01D 53/9418* (2013.01); *B01D 53/9495* (2013.01); *F01N 11/00* (2013.01); *B01D 53/944* (2013.01); *B01D 2255/1021* (2013.01); *B01D 2255/1023* (2013.01); *B01D 2255/1025* (2013.01); *B01D 2255/2027* (2013.01); *B01D 2255/20707* (2013.01); *B01D 2255/20723* (2013.01); *B01D 2255/20738* (2013.01); *B01D 2255/20746* (2013.01); *B01D 2255/20761* (2013.01); *B01D 2255/20776* (2013.01); *B01D 2255/50* (2013.01); *F01N 2550/05* (2013.01);
(Continued)

(58) Field of Classification Search
CPC .......... F01N 2550/05; F01N 2560/026; F01N 2570/14; F01N 2610/02; F01N 2900/0601; F01N 2900/1404; F01N 2900/1411; F01N 3/08
USPC ......... 60/272–274, 276, 277, 282, 286, 287, 60/295, 301, 302, 303
See application file for complete search history.

(56) References Cited

U.S. PATENT DOCUMENTS

2014/0056790 A1*  2/2014  Geveci ................... F01N 3/208
                                                        423/212

* cited by examiner

*Primary Examiner* — Mark A Laurenzi
*Assistant Examiner* — Mickey H France
(74) *Attorney, Agent, or Firm* — Cantor Colburn LLP

(57) ABSTRACT

A method for treating exhaust gas from an internal combustion engine including, determining if a steady state condition exist and perturbing a reductant injection corresponding the steady state. Measuring a first and a second NOx values corresponding to the steady state and resulting from the perturbation, and computing a gradient of the $NO_x$ values relative to the steady state respectively. The method also includes comparing the gradient of the second $NO_x$ value with one of the first $NO_x$ value, if the gradient of the first NOx value is within a selected range of the gradient of the second NOx value, identifying poor efficiency operation for the engine and setting an estimated reductant storage at zero. Otherwise if the gradient of the second NOx value exceeds a selected threshold, identifying a reductant slip condition and setting the estimated storage at maximum, if not, making no corrections in estimated storage.

20 Claims, 6 Drawing Sheets

(52) U.S. Cl.
CPC .... *F01N 2560/026* (2013.01); *F01N 2570/14* (2013.01); *F01N 2610/02* (2013.01); *F01N 2900/0601* (2013.01); *F01N 2900/1404* (2013.01); *F01N 2900/1411* (2013.01)

UNDERFLOW SELECTIVE CATALYTIC REDUCTION STEADY STATE AMMONIA SLIP DETECTION WITH POSITIVE PERTURBATION

INTRODUCTION

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

Exhaust gas treatment systems typically include selective catalytic reduction (SCR) devices. An SCR device includes a substrate having an SCR catalyst disposed thereon to reduce the amount of NOx in the exhaust gas. The typical exhaust treatment system also includes a reductant delivery system that injects a reductant such as, for example, ammonia (NH3), urea (CO(NH2)2, etc.). The SCR device makes use of NH3 to reduce the NOx. For example, when the proper amount of NH3 is supplied to the SCR device under the proper conditions, the NH3 reacts with the NOx in the presence of the SCR catalyst to reduce the NOx emissions. However, if the reduction reaction rate is too slow, or if there is excess ammonia in the exhaust, ammonia can slip from the SCR. On the other hand, if there is too little ammonia in the exhaust, SCR NOx conversion efficiency will be decreased.

SUMMARY

Described herein is an emissions control system for treating exhaust gas in a motor vehicle including an internal combustion engine, the emissions control system includes a selective catalytic reduction (SCR) device, an underflow selective catalytic reduction (UFSCR) device operably connected downstream of and in fluid communication with the SCR device, a first NOx sensor operably connected to and in fluid communication with the exhaust gas downstream of the SCR device and a second NOx sensor operably connected to and in fluid communication with the exhaust gas downstream of the UFSCR device. The emissions control system also includes a controller operably connected to the SCR device, the first NOx sensor, the second NOx sensor, the controller configured to perform reductant slip detection method by, determining if the SCR device is in a steady state operating condition with a steady state reductant injection, under selected conditions, perturbing a reductant injection corresponding the steady state; the perturbation of the reductant injection having a selected magnitude and a selected duration, measuring a NOx value from the first NOx sensor corresponding to the steady state, and measuring a NOx value from the second NOx sensor corresponding to the steady state. The detection method also including a measuring a NOx value from the first NOx sensor resultant from the perturbing the reductant injection and computing a gradient in the NOx value resultant from the perturbing the reductant injection relative to the NOx value measured at steady state from the first NOx sensor, measuring the NOx value from the second NOx sensor resultant from the perturbing the reductant injection and computing a gradient in the NOx value resultant from the perturbing the reductant injection relative to the NOx value measured from the second NOx sensor at steady state; comparing the gradient of the NOx value from the second NOx sensor resultant from the perturbing with the gradient of the NOx value from the first NOx sensor resultant from the perturbing, and if the gradient NOx value from the first NOx sensor resultant from the perturbing is within a selected range of the gradient of the NOx value from the second NOx sensor resultant from the perturbing identifying poor efficiency operation for the engine and setting an estimated reductant storage at zero. Otherwise, if the gradient NOx value from the second NOx sensor resultant from the perturbing exceeds a selected threshold, identifying a reductant slip condition and setting the estimated reductant storage at maximum, otherwise, making no corrections in estimated reductant storage.

In addition to one or more of the features described above, or as an alternative, further embodiments may include a temperature sensor operably connected to and in fluid communication with the exhaust gas, the temperature sensor in operable communication with the controller.

In addition to one or more of the features described above, or as an alternative, further embodiments may include a third NOx sensor operably connected to and in fluid communication with the exhaust gas, the third NOx disposed upstream of the SCR device and in operable communication with the controller.

In addition to one or more of the features described above, or as an alternative, further embodiments may include the controller executing a method further including, computing a gradient of a temperature of the SCR device and a gradient of a NOx value measured by the first NOx sensor and comparing a steady state NOx value from the third NOx sensor with a predicted steady state NOx value.

In addition to one or more of the features described above, or as an alternative, further embodiments may include that the selected conditions include identifying the SCR devices as at steady state if the gradient of a temperature of the SCR device is less than a third selected threshold value and a gradient of the NOx measured by the another NOx sensor is less than a fourth selected threshold value.

In addition to one or more of the features described above, or as an alternative, further embodiments may include that the predicted NOx value is based on a chemical model of the SCR device.

In addition to one or more of the features described above, or as an alternative, further embodiments may include the controller executing a method including, adapting a reductant dosing rate of the SCR device according to the comparing.

In addition to one or more of the features described above, or as an alternative, further embodiments may include that the first NOx sensor is located downstream from the SCR device.

In addition to one or more of the features described above, or as an alternative, further embodiments may include that the second NOx sensor is located downstream from the UFSCR device.

In addition to one or more of the features described above, or as an alternative, further embodiments may include that the selected range is based on at least a temperature of the UFSCR device and a flow of the exhaust gas.

In addition to one or more of the features described above, or as an alternative, further embodiments may include that at least one of the selected magnitude and selected duration of the perturbing a reductant injection is based on at least one of a magnitude of the steady state reductant injection, an exhaust flow and a temperature.

Also described herein in an embodiment is a method for treating exhaust gas emitted by an internal combustion engine, configured to perform a selective catalytic reduction (SCR) of exhaust gas in a controller operably connected to a first NOx sensor and second NOx sensor, each disposed in the exhaust gas. The controller is configured to execute the method for ammonia slip detection including determining if the SCR device is in a steady state operating condition with a steady state reductant injection, under selected conditions, perturbing a reductant injection corresponding the steady state; the perturbation of the reductant injection having a selected magnitude and a selected duration, measuring a NOx value from the first NOx sensor corresponding to the steady state and measuring a NOx value from the second NOx sensor corresponding to the steady state. The method also includes measuring a NOx value from the first NOx sensor resultant from the perturbing the reductant injection and computing a gradient in the NOx value resultant from the perturbing the reductant injection relative to the NOx value measured at steady state from the first NOx sensor, measuring the NOx value from the second NOx sensor resultant from the perturbing the reductant injection and computing a gradient in the NOx value resultant from the perturbing the reductant injection relative to the NOx value measured from the second NOx sensor at steady state, and comparing the gradient of the NOx value from the second NOx sensor resultant from the perturbing with the gradient of the NOx value from the first NOx sensor resultant from the perturbing. The method also includes that if the gradient NOx value from the first NOx sensor resultant from the perturbing is within a selected range of the gradient of the NOx value from the second NOx sensor resultant from the perturbing, identifying poor efficiency operation for the engine and setting an estimated reductant storage at zero, otherwise, if the gradient NOx value from the second NOx sensor resultant from the perturbing exceeds a selected threshold, identifying a reductant slip condition and setting the estimated reductant storage at maximum, otherwise, making no corrections in estimated reductant storage.

In addition to one or more of the features described above, or as an alternative, further embodiments may include operably connecting a temperature sensor with the controller, the temperature sensor in fluid communication with the exhaust gas.

In addition to one or more of the features described above, or as an alternative, further embodiments may include operably connecting a third NOx sensor with the controller, the third NOx disposed upstream of the SCR device and in fluid communication with the exhaust gas.

In addition to one or more of the features described above, or as an alternative, further embodiments may further include the controller executing a method including computing a gradient of a temperature of the SCR device and a gradient of a NOx value measured by the first NOx sensor and comparing a steady state NOx value from the third NOx sensor with a predicted steady state NOx value.

In addition to one or more of the features described above, or as an alternative, further embodiments may include that the selected conditions include identifying the SCR devices as at steady state if the gradient of a temperature of the SCR device is less than a third selected threshold value and a gradient of the NOx measured by the another NOx sensor is less than a fourth selected threshold value.

In addition to one or more of the features described above, or as an alternative, further embodiments may include that the predicted NOx value is based on a chemical model of the SCR device.

In addition to one or more of the features described above, or as an alternative, further embodiments may include the controller executing a method including, adapting a reductant dosing rate of the SCR device according to the comparing.

In addition to one or more of the features described above, or as an alternative, further embodiments may include that at least one of the selected magnitude and selected duration of the perturbing a reductant injection is based on at least one of a magnitude of the steady state reductant injection, an exhaust flow and a temperature.

In addition to one or more of the features described above, or as an alternative, further embodiments may include that the selected range is based on at least the temperature and a flow of the exhaust gas.

Further, in one or more examples, the predicted NOx value is based on a chemical model of the SCR device.

Further, in one or more examples, the controller further determines that an operating state of the internal combustion engine, and initializes the ammonia slip detection in response to the internal combustion engine operating in a steady state.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
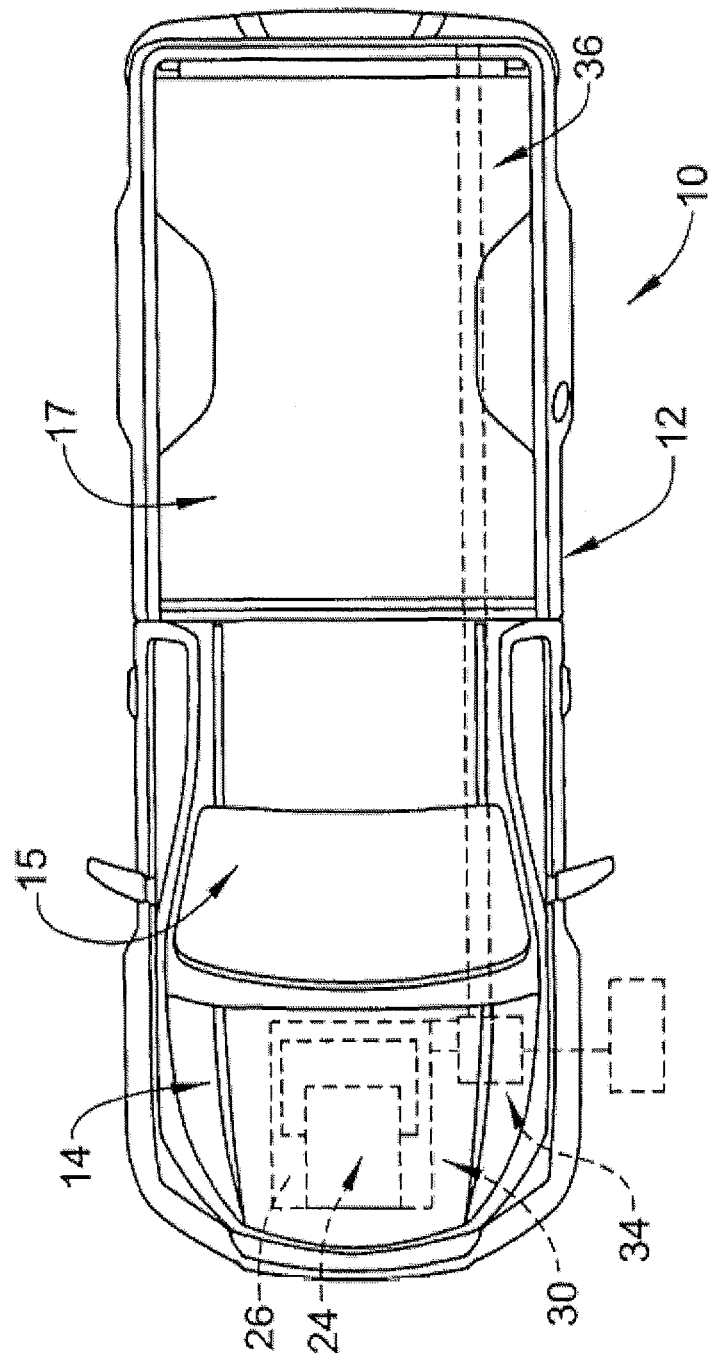
FIG. 1 depicts a motor vehicle including an internal combustion engine and an emission control system according to one or more embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

A motor vehicle, in accordance with an aspect of an embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the illustrative embodiment shown, may include a diesel engine 26. Internal combustion engine system 24 includes an exhaust system 30 that is fluidically connected to an aftertreatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems 24 that can include, but are not limited to, diesel engine systems 26 and gasoline engine systems. The ICE system 24 can include a plurality of reciprocating pistons attached to a crankshaft, which may be operably attached to a driveline, such as a vehicle driveline, to power a vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICEs 24 may be described in a vehicular context (e.g., generating torque), other non-vehicular applications are within the scope of this disclosure. Therefore, when reference is made to a vehicle, such disclosure should be interpreted as applicable to any application of an ICE system 24.

Moreover, an ICE system 24 can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 24 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

Figure 2:
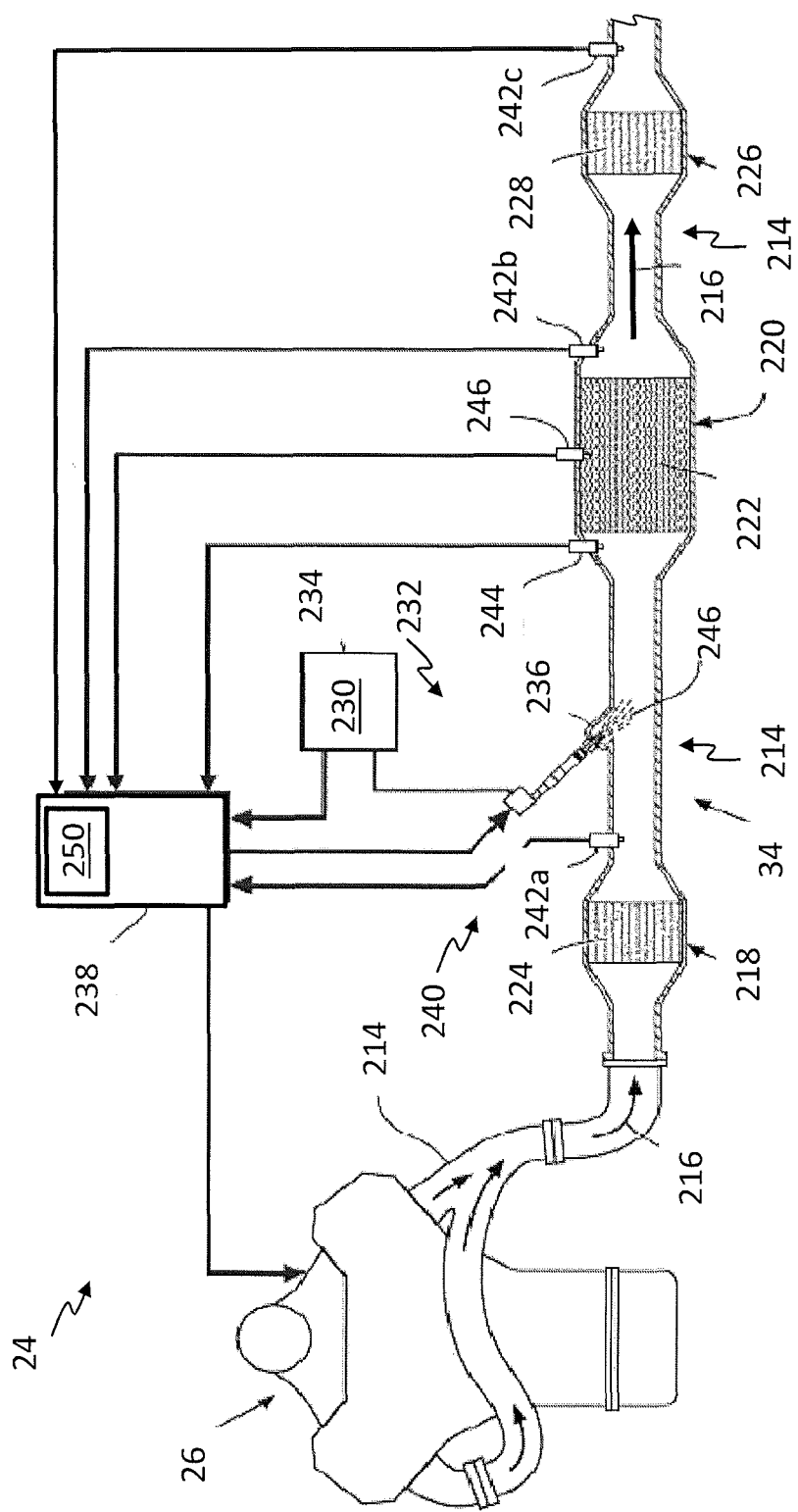
FIG. 2 illustrates example components of an emissions control system according to one or more embodiments.

FIG. 2 illustrates example components of the emissions control system 34 according to one or more embodiments. It should be noted that while the ICE system 24 includes a diesel engine 26 in the above example, the emissions control system 34 described herein can be implemented in various engine systems. The emissions control system 34 facilitates the control and monitoring of $NO_x$ storage and/or treatment materials, to control exhaust produced by the ICE system 24. For example, the technical solutions herein provide methods for controlling selective catalytic reduction (SCR) devices, and appurtenant $NO_x$ sensors, wherein the SCR devices are configured to receive exhaust gas streams from an exhaust gas source. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. SCR devices are configured to receive reductant, such as at variable dosing rates as will be described below.

The exhaust gas conduit 214, which may comprise several segments, transports exhaust gas 216 from the engine 26 to the various exhaust treatment devices of the emissions control system 34. For example, as illustrated, the emission control system 34 includes a SCR device 220. In one or more examples, the SCR device 220 can include a selective catalytic filter (SCRF) device, which provides the catalytic aspects of SCRs in addition to particulate filtering capabilities. Alternatively, or in addition, the SCR device 220 can also be coated on a flow through substrate. As can be appreciated, the emission control system 34 can include various additional treatment devices, including a diesel oxidation catalyst (DOC) devices 218, and particulate filter devices (not shown), among others.

As can be appreciated, the DOC device 218 can be of various flow-through, oxidation catalyst devices known in the art. In various embodiments the DOC device 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The DOC Device 218 is useful in treating unburned gaseous and non-volatile HC and CO, which are oxidized to form carbon dioxide and water. A washcoat layer includes a compositionally distinct layer of material disposed on the surface of the monolithic substrate 224 or an underlying washcoat layer. A catalyst can contain one or more washcoat layers, and each washcoat layer can have unique chemical catalytic functions. In the SCR device 220, the catalyst compositions for the SCR function and $NH_3$ oxidation function can reside in discrete washcoat layers on the substrate 224 or, alternatively, the compositions for the SCR device 220 and NH$_3$ oxidation functions can reside in discrete longitudinal zones on the substrate 224.

The SCR device 220 can include, for example, a flow-through ceramic or metal monolith substrate that can be packaged in a shell or canister having an inlet and an outlet in fluid communication with the exhaust gas conduit 214 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the catalyst composition can be washcoated. The substrate body can be formed from a material capable of withstanding the temperatures and chemical environment associated with the exhaust gas 216. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating TiO$_2$ material, for example. The substrate body can also function as a particle filter as will be discussed below.

The SCR catalyst compositions are generally a porous and high surface area material which can operate efficiently to convert NO$_x$ constituents in the exhaust gas 216 in the presence of a reductant 230, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques. The SCR catalyst composition can optionally further comprise one or more base metal oxides as promoters to further decrease the SO$_3$ formation and to extend catalyst life. The one or more base metal oxides can include WO$_3$, Al$_2$O$_3$, and MoO$_3$, in some embodiments. In one embodiment, WO$_3$, Al$_2$O$_3$, and MoO$_3$ can be used in combination with V$_2$O$_5$.

The SCR device 220 may be disposed downstream from the DOC device 218. In one or more examples, the SCR device 220 includes a filter portion 222 that can be a wall flow filter, which is configured to filter or trap carbon and other particulate matter from the exhaust gas 216. In at least one embodiment, the filter portion 222 is formed as a particulate filter (PF), such as a diesel particulate filter (DPF). The filter portion 222 (i.e., the PF) may be constructed, for example, using a ceramic wall flow monolithic exhaust gas filter substrate (not shown), which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc. The emissions control system 34 may also perform a regeneration process that regenerates the filter portion 222 by burning off the particulate matter trapped in the filter substrate, in one or more examples.

In one or more examples, the SCR device 220 receives reductant 230, such as at variable dosing rates. Reductant 230 can be supplied from a reductant supply source 234. In one or more examples, the reductant 230 is injected into the exhaust gas conduit 214 at a location upstream of the SCR device 220 using an injector 236, or other suitable method of delivery. The reductant 230 can be in the form of a gas, a liquid, or an aqueous solution, such as an aqueous urea solution. In one or more examples, the reductant 230 can be mixed with air in the injector 236 to aid in the dispersion of the injected reductant 230. The catalyst containing washcoat disposed on the filter portion 222 or a flow through catalyst or a wall flow filter may reduce NOx constituents in the exhaust gas 216. The SCR device 220 utilizes the reductant 230, such as ammonia (NH$_3$), to reduce the NOx. The catalyst containing washcoat may contain a zeolite and one or more base metal components such as iron (Fe), cobalt (Co), copper (Cu), or vanadium (V), which can operate efficiently to convert NOx constituents of the exhaust gas 216 in the presence of NH$_3$.

The emissions control system 34 may also include an underflow selective catalyst reduction (UFSCR) device 226 disposed downstream from the SCR device 220. In one or more examples, the UFSCR device 226 receives exhaust gases 216 that have passed the SCR device 220. The UFSCR device 226 may be similar in to the SCR device 220 in configuration and function as described above. For example, the UFSCR device 226 may include, for example, a flow-through ceramic or metal monolith substrate packaged in a shell or canister having an inlet and an outlet in fluid communication with the exhaust gas conduit 214 and optionally other exhaust treatment devices.

As described above, reductant 230 is injected into the exhaust gas conduit 214 at a location upstream of the SCR device 220. In operation, the reductant injection rate is precisely controlled to ensure sufficient NOx reduction and ammonia storage by the SCR device 220. An insufficient injection rate may result in unacceptably low NOx conversions and thereby higher emissions. An injection rate that is too high results in excess ammonia and release of ammonia from the SCR device 220 to the downstream exhaust gases 214. These ammonia emissions from SCR device 220 are known as ammonia slip. Ammonia slip is undesirable because of the emissions as well as exhausting the reductant supply 234 too rapidly. To address these concerns, in some embodiments the UFSCR 226 may be employed. The UFSCR 226 receives as an input the exhaust gases 216 that have passed the SCR device 220 and may include excess ammonia. Similar to the SCR device 220, the UFSCR 226 includes, but is not limited to, a catalyst similar to that described with respect to the SCR device 220 above containing a wash coat that may further reduce NOx constituents in the exhaust gas 216.

In one or more examples, the emissions control system 34 further includes a control module 238 operably connected via a number of sensors to monitor the engine 26 and/or the exhaust gas emission control system 34. For example, control module 238 can execute control process as described herein and a SCR chemical model 250, as described below. The control module 238 can be operably connected to ICE system 24, SCR device 220, UFSCR 226 and/or one or more sensors. As shown, the sensors, shown generally as 240, can include an upstream $NO_x$ sensor 242a and downstream $NO_x$ sensor 242b, disposed downstream of SCR device 220, and a third NOx sensor 242c disposed downstream of the UFSCR 226. Each of the NOx sensors 242a, 242b, and 242c are in fluid communication with exhaust gas 216 in the exhaust gas conduit 214. In one or more examples, the upstream NOx sensor 242a is disposed downstream of the ICE system 24 and upstream of both SCR device 220 and the injector 236. The upstream $NO_x$ sensor 242a, downstream $NO_x$ sensor 242b, and downstream $NO_x$ sensor 242c detect a $NO_x$ level proximate their location within exhaust gas conduit 214, and generate NOx signals, which correspond to the NOx levels detected. A NOx level can comprise a concentration, a mass flow rate, or a volumetric flow rate, in some embodiments. A NOx signal generated by a NOx sensor 242a, 242b and 242c can be interpreted by control module 238, for example. In addition, the control module 238 can optionally be in communication one or more temperature sensors, such as upstream temperature sensor 244, disposed upstream from SCR device 220. The temperature sensor 244 generates a signal indicative of the temperature of the exhaust gases 216 in the exhaust gas conduit 214.

The sensors of the emissions control system 34 may further include at least one pressure sensor 246 (e.g., a delta pressure sensor). The delta pressure sensor 246 may determine the pressure differential (i.e., Δp) across the SCR device 220. Although a single delta pressure sensor 246 is illustrated, it is appreciated that a plurality of pressure sensors may be used to determine the pressure differential of the SCR device 220. For example, a first pressure sensor (not shown) may be disposed at the inlet of the SCR device 220 and a second pressure sensor (also not shown) may be disposed at the outlet of the SCR device 220. Accordingly, the difference between the pressure detected by the second pressure sensor and the pressure detected by the first pressure sensor may indicate the pressure differential across the SCR device 220. It should be noted that in other examples, the sensors can include different, additional, or fewer sensors than those illustrated/described herein.

The SCR device 220 and UFSCR 226 include an SCR catalyst that generally uses the reductant 230 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 230 can be ammonia ($NH_3$), such as anhydrous ammonia or aqueous ammonia, or generated from a nitrogen and hydrogen rich substance such as urea ($CO(NH_2)_2$). Additionally or alternatively, the reductant 230 can be any compound capable of decomposing or reacting in the presence of exhaust gas 216 and/or heat to form ammonia. Equations (1)-(5) provide exemplary chemical reactions for $NO_x$ reduction involving ammonia.

$$6NO+4NH_3 \rightarrow 5N_2+6H_2O \tag{1}$$

$$4NO+4NH_3+O_2 \rightarrow 4N_2+6H_2O \tag{2}$$

$$6NO_2+8NH_3 \rightarrow 7N_2+12H_2O \tag{3}$$

$$2NO_2+4NH_3+O_2 \rightarrow 3N_2+6H_2O \tag{4}$$

$$NO+NO_2+2NH_3 \rightarrow 2N_2+3H_2O \tag{5}$$

It should be appreciated that Equations (1)-(5) are merely illustrative, and are not meant to confine the SCR device 220 and/or UFSCR device 226 to a particular NOx reduction mechanism or mechanisms, nor preclude the operation of other mechanisms. The SCR device 220 and/or UFSCR device 226 can be configured to perform any one of the above NOx reduction reactions, combinations of the above NOx reduction reactions, and other NOx reduction reactions.

The reductant 230 can be diluted with water in various implementations. In implementations where the reductant 230 is diluted with water, heat (e.g., from the exhaust) evaporates the water, and ammonia is supplied to the SCR device 220. Non-ammonia reductants can be used as a full or partial alternative to ammonia as desired. In implementations where the reductant 230 includes urea, the urea reacts with the exhaust to produce ammonia, and ammonia is supplied to the SCR device 220. Reaction (6) below provides an exemplary chemical reaction of ammonia production via urea decomposition.

$$CO(NH2)2+H2O \rightarrow 2NH3+CO2 \tag{6}$$

It should be appreciated that Equation (6) is merely illustrative, and is not meant to confine the urea or other reductant 230 decomposition to a particular single mechanism, nor preclude the operation of other mechanisms.

The SCR catalyst can store (i.e., absorb, and/or adsorb) reductant 230 for interaction with exhaust gas 216. For example, the reductant 230 can be stored within the SCR device 220 and/or UFSCR device 226. A given SCR device 220 and/or UFSCR device 226 has a reductant capacity, or an amount of reductant or reductant derivative it is capable of storing. The amount of reductant 230 actually stored within an SCR device 220 and/or UFSCR device 226, relative to its reductant storage capacity can be referred to as the SCR "reductant loading", and can be indicated as a % loading (e.g., 90% reductant loading). During operation of SCR device 220, injected reductant 230 is stored in the SCR catalyst of the SCR device 220 and UFSCR device 226 respectively, and is consumed during reduction reactions with NOx species requiring continual replenishment. Determining the precise amount of reductant 230 to inject is critical to maintaining exhaust gas emissions at acceptable levels: insufficient reductant levels within the emissions control system 34 (e.g., within SCR device 220 and UFSCR device 226) can result in undesirable NOx species emissions ("NOx breakthrough"). Excessive reductant injection can result in undesirable amounts of reductant 230 passing through the SCR device 220 and UFSCR device 226 unreacted ("reductant slip"). Reductant slip and NOx breakthrough can also occur when the SCR catalyst is below a "light-off" temperature, for example if the SCR device 220 and UFSCR device 226 are saturated with NH3 (i.e., no more storage sites). SCR dosing logic can be utilized to command reductant dosing, and adaptations thereof, and can be implemented by control module 238, for example.

Controlling the precise amount of ammonia to be applied to the SCR device 220 for reaction and storage and subsequently passed through to the UFSCR device 226 ensures maintaining sufficient reductant storage levels in the SCR device 220 and ultimately the UFSCR device 226 to facilitate maintaining exhaust gas emissions at acceptable levels. As mentioned previously, insufficient reductant storage levels in the UFSCR can result in NOx breakthrough, while excessive reductant 230 passing through the UFSCR device 226 unreacted or exiting the UFSCR device 226 as reductant slip. In operation, with the UFSCR device, reductant slip and NOx breakthrough can also occur when the UFSCR catalyst is below a "light-off" temperature, for example if the UFSCR device 226 is saturated with NH3 (i.e., no more storage sites) and light-off has not occurred. SCR dosing logic can be utilized to command reductant 230 dosing, and adaptations thereof, and can be implemented by control module 238, for example to control dosing in the SCR device 220 and there by ammonia provided downstream to the UFSCR device 226.

A reductant injection dosing rate (e.g., grams per second) can be determined by a SCR chemical model 250 which, among other things, predicts the amount of reductant 230 stored in the SCR device 220 and optionally the UFSCR device 226 based on signals from one or more of reductant injection (e.g., feedback from injector 236) and upstream NOx (e.g., NOx signal from upstream NOx sensor 242a also denoted as $NO_{x1}$). The SCR chemical model 250 further predicts NOx levels of exhaust gas 216 discharged from the SCR device 220 and as provided to the UFSCR device 226. Likewise, the SCR chemical model may also predict the NOx level of exhaust gas 216 discharged from the UFSCR device 226 and exhausted to the atmosphere. The SCR chemical model 250 can be implemented by control module 238. The SCR chemical model 250 can be updatable by one or more process values over time, for example. A dosing governor (not shown), such as one controlled by control module 238, monitors the reductant storage level predicted by the SCR chemical model 250, and compares the same to a desired reductant 230 storage level based on conditions of the exhaust gas 216 exiting the SCR device 220 and the exhaust gas 216 exiting the UFSCR device 226 respectively. Deviations between the predicted reductant storage level and the desired reductant storage level can be continuously monitored and a dosing adaptation can be triggered to increase or decrease reductant dosing in order to eliminate or reduce the deviation. For example, the reductant dosing rate can be adapted to achieve a desired ammonia level and/or $NO_x$ concentration in exhaust gas 216 downstream of the SCR device 220. The desired ammonia level exiting from the SCR device 220 operates as reductant input to the UFSCR device 226 for storage therein. A desired conversion rate can be determined by many factors, such as the characteristics of SCR catalyst type and/or operating conditions of the system (e.g., ICE system 24 operating parameters).

Over time, inaccuracies of the SCR chemical model 250 can compound to appreciative errors between modeled reductant storage levels and actual reductant storage levels in the SCR device 220 and UFSCR device 226 respectively. Accordingly, the SCR chemical model 250 can be continuously corrected to minimize or eliminate errors. One method for correcting an SCR chemical model 250 includes comparing the modeled SCR and UFSCR discharge exhaust gas $NO_x$ levels to the actual $NO_x$ levels (e.g., as measured by downstream NOx sensor 242b) to determine a discrepancy between the two. Under selected conditions, the model 250 may be corrected or updated to eliminate or reduce the discrepancy. Because $NO_x$ sensors (in particular, downstream NOx sensor 242b) are cross-sensitive to reductant (e.g., $NH_3$) and $NO_x$, it is critical to distinguish between reductant signals and $NO_x$ signals as reductant slip can be confused with insufficient $NO_x$ conversion.

Passive analysis techniques may be used to distinguish between reductant signals and $NO_x$ signals. Once such technique is a correlation method which includes comparing the $NO_x$ concentration (e.g., such as measured by upstream $NO_x$ sensor 242a) movement upstream of an SCR device (e.g., SCR device 220 or UFSCR device 226) with the $NO_x$ concentration downstream of the device (e.g., such as measured by downstream $NO_x$ sensor 242b, also denoted as $NO_{x2}$). Diverging concentration directions indicate an increase or a decrease in reductant in the exhaust gases 216.

Alternatively, or in addition, the comparison may include a frequency or spectral analysis. $NO_x$ signals generated by $NO_x$ sensors can include multiple frequency components (e.g., high frequency and low frequency) due to the variation of the $NO_x$ concentration and/or the reductant concentrations. High frequency signals generally relate primarily to $NO_x$ concentration, while low frequency signals generally relate to both $NO_x$ concentration and reductant concentration. Based on variations in the spectral content of the signals a determination of when reductant is passing through the device can be made.

A drawback of the passive analysis techniques is that they cannot be implemented while the emission control system 34 and SCR device 220 or UFSCR device 226 is in a steady state. In some instances, "Steady state" is determined, for example, by taking the root mean square value of a $NO_x$ signal upstream from SCR device 220 (e.g., such as measured by upstream $NO_x$ sensor 242a) over a moving time frame; a sufficiently small value indicates a minimal variation in upstream NOx concentration and the SCR device 220 can be considered to be in steady state. For example, a steady state condition can be comprise a root mean square value of the upstream $NO_x$ concentration of less than a predetermined value, such as about 30 ppm, less than about 20 ppm, or less than about 10 ppm. SCR steady state conditions can often correlate with ICE system 24 steady state conditions (e.g., generally consistent RPM, fuel injection, temperature, etc.) Intrusive tests can be used to distinguish between reductant signals and $NO_x$ signals, which include halting all or most reductant dosing for a period of time. While intrusive tests can be performed under steady state conditions, they can, in some circumstances, yield undesirable exhaust emissions during the test period, such as emissions with an increased NOx concentration.

Figure 3:
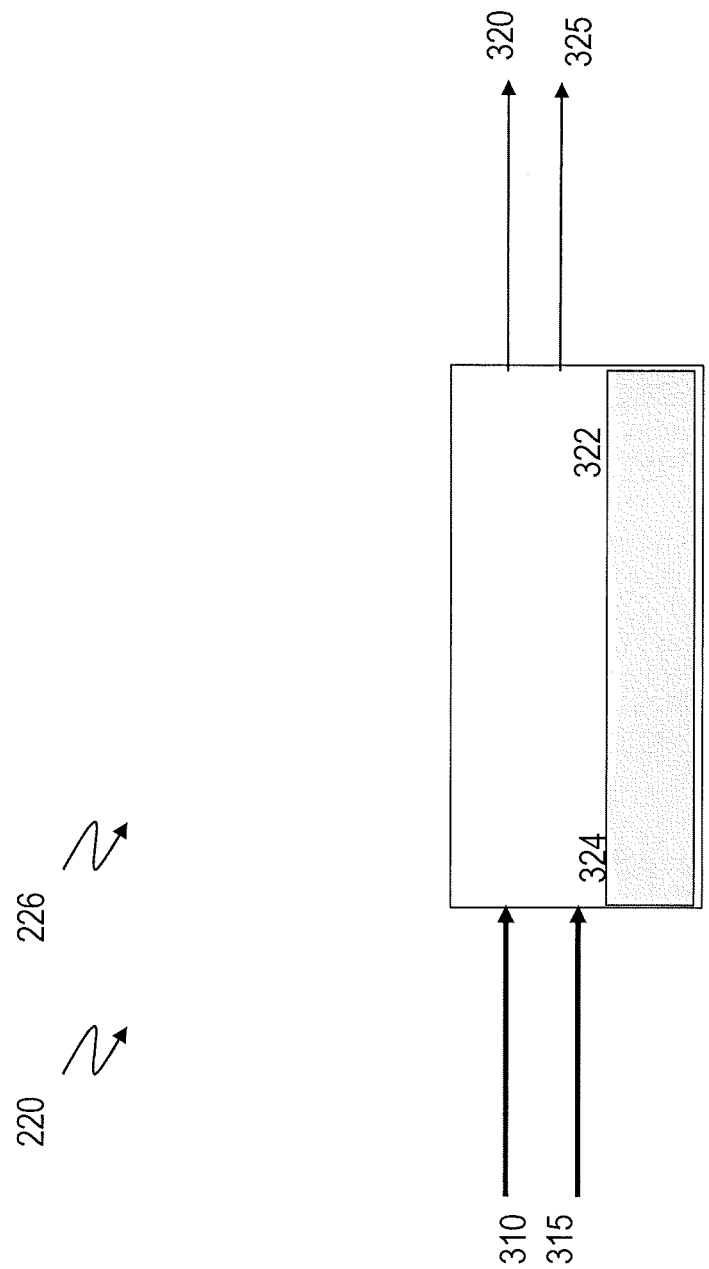
FIG. 3 illustrates an example flow of the gases through an SCR device, according to one or more embodiments.

FIG. 3 illustrates an example flow of the gas exhaust 216 through the SCR device 220 and similarly for the UFSCR device 226, according to one or more embodiments. The control module 238 (FIG. 2) measures the flow rate (F) of gas volume, and concentration C of the gas. For example, the SCR device 220 determines an input flow-rate of $NO_x$ 310 as $FC_{NOx,in}$, where F is the volume of the incoming exhaust gas 216, and $C_{NOx,in}$ is the inlet concentration of NOx in the incoming gas 216. Similarly, $FC_{NH3,in}$ is the volume of the flow-rate of $NH_3$ 315 in the incoming gas 216, $C_{NH3,in}$ being the inlet concentration of $NH_3$. Further, compensating for the amount of adsorption 322 and amount of desorption 324, and the amounts reacted on the catalyst surface, the control module 238 may determine $C_{NH3}$ as the SCR concentration of $NH_3$, and $C_{NOx}$ as SCR concentration of NOx.

Accordingly, $FC_{NOx}$ is the $NO_x$ outlet volume flow rate 320 of $NO_x$ through the outlet of the SCR device 220 (or likewise the UFSCR device 226). In one or more examples, the control module 238 may determine $W_{NOx}$, $FC_{NOx}$ as mass flow rate 320 of $NO_x$, where $W_{NOx}$ is the molecular weight of NOx. Similarly, for $NH_3$, the outlet volume flow rate 325 is $FC_{NH3}$ with the mass flow rate of $NH_3$ being $W_{NH3}FC_{NH3}$.

As described earlier, the control module 238 controls the reductant injection rate precisely to ensure efficient operation of the emission control system 34 while maintaining acceptable emissions. As described above, in some embodiments the UFSCR device 226 further stores the ammonia passing from the SCR device 220 operating as further reductant storage for further NOx emissions reductions. Likewise, controlling the precise amount of ammonia to be applied to the UFSCR device 226 ensures maintaining exhaust gas emissions at acceptable levels: insufficient reductant levels within the emission control system 34 (e.g., within UFSCR device 226) can result in undesirable NOx species emissions ("NOx breakthrough") from the emission control system 34 (e.g., via a vehicle tailpipe), while excessive reductant 230 passing through the UFSCR device 226 unreacted or exiting the UFSCR device 226 as an undesired reaction product ("UFSCR reductant slip"). As will be appreciated SCR dosing logic can be utilized to command reductant 230 dosing, and adaptations thereof, to control dosing in the SCR device 220 and thereby ammonia provided downstream to the UFSCR device 226 to further improve emissions.

Accordingly, referring back to FIG. 2, the control module 238 controls operation of the injector 236 based on the chemical model 250 and desired $NH_3$ storage setpoint to determine an amount of reductant 230 to be injected as described herein. The control module 238 may determine a correction coefficient corresponding to the reductant storage based on monitoring the one or more sensors, and may more precisely control the amount of injected reductant 230 provided by the injector 236. For example, the control module 238 determines a reductant injector energizing time correction coefficient to further reduce or eliminate discrepancy between the chemical model 250 and actual SCR outlet NOx emissions or UFSCR outlet NOx emissions. Alternatively, or in addition, the control module 238 determines a $NH_3$ set-point correction to reduce or eliminate discrepancy between the chemical model 250 and actual SCR outlet NOx emissions. Accordingly, the supply of reductant 230 may be utilized more efficiently. For example, the reducing agent injected into the exhaust gas 216 may form $NH_3$ when injected into the exhaust gas 216. Accordingly, the control module 238 controls an amount of $NH_3$ supplied to the SCR device 220. The SCR catalyst adsorbs (i.e., stores) $NH_3$. The amount of $NH_3$ stored by the SCR device 220 and/or the UFSCR device 226 may be referred to hereinafter as an "$NH_3$ storage level." The control module 238 may control the amount of $NH_3$ supplied to the SCR device 220 to regulate the $NH_3$ storage level. $NH_3$ stored in the SCR device 220 reacts with NOx in the exhaust gas 216 passing therethrough. Likewise, the control module 238 may control the amount of $NH_3$ supplied to the SCR device 220 to regulate the $NH_3$ storage level or amount of ammonia slip beyond the SCR device 220 as input to the UFSCR device 226. $NH_3$ stored in the UFSCR device 226 for the ammonia slip reacts with NOx in the exhaust gas 216 passing therethrough.

In one or more examples, the percentage of $NO_x$ that is removed from the exhaust gas 216 entering the SCR device 220 may be referred to as a conversion efficiency of the SCR device 220. The control module 238 may determine the conversion efficiency of the SCR device 220 based on $NOx_{in}$ and $NOx_{out}$ signals generated by the first (upstream) NOx sensor 242a and second (downstream) NOx sensor 242b respectively. For example, the control module 238 may determine the conversion efficiency of the SCR device 220 based on the following equation:

$$SCReff = (NOxin - NOxout)/NOxin \qquad (7)$$

$NH_3$ slip can also be caused because of an increase in the temperature of the SCR catalyst. For example, $NH_3$ may desorb from the SCR catalyst when the temperature increases at times when the $NH_3$ storage level is near to the maximum $NH_3$ storage level. $NH_3$ slip may also occur due to an error (e.g., storage level estimation error) or faulty component (e.g., faulty injector) in the emissions control system 34.

Typically, the control module 238 estimates an $NH_3$ storage level of the SCR device 220 based on the chemical model 250. In one or more examples, the $NH_3$ storage set-point ("set-point") is calibrate-able. The control module 238 uses the chemical model 250 to estimate the current storage level of $NH_3$ in the SCR device 220, and a storage level governor provides feedback to the injection controls to determine the injection rate to provide $NH_3$ for reactions according to the chemical model 250 and to maintain a target storage level. The set-point may indicate a target storage level for given operating conditions (e.g., a temperature of the SCR catalyst). Accordingly, the set-point may indicate a storage level (S) and a temperature (T) of the SCR device 220. The set-point may be denoted as (S, T). The control module 238 controls the reductant injector 236 to manage the amount of reducing agent injected into the exhaust gas 216 to adjust the storage level of the SCR device 220 to the set-point. For example, the control module 238 commands the injector 236 to increase or decrease reductant 236 flow, and thereby the storage level to reach the set-point when a new set-point is determined. Additionally, the control module 238 commands the reductant injector 236 to increase or decrease reductant flow to increase or decrease the reductant storage level to maintain the set-point when the set-point has been reached.

The technical features described herein facilitate the emissions control system 34 to enter a steady state ammonia slip detection based on a downstream $NO_x$. In some systems, steady state, ammonia slip detection is performed by disabling diesel exhaustive fluid (DEF) injection. However, such techniques may potentially increase $NO_x$ emissions during DEF injection dose-off events. Accordingly, in one or more embodiments, the ammonia slip and/or $_{NOx}$ breakthrough detection is performed by perturbing the emission control system 34, and more particularly, in an embodiment, perturbing the DEF injection rate, and monitoring the SCR device 220 and $NO_x$ responses rather than by disabling DEF injection to intrusively detect the presence of $NH_3$ slip or $NO_x$ breakthrough in steady state operating conditions. The use of such a perturbation technique advantageously can prevent the $NO_x$ emissions increases that may result from DEF injection disablement.

In one or more examples, the control module 238 uses the chemical model 250 of the SCR catalyst to predict the NOx concentration in the exhaust gases 216 entering the SCR device 220. Further, based on the predicted $NO_x$ concentration, the control module 238 determines an amount of $NH_3$ with which to dose the exhaust gases 216 to satisfy the emissions threshold. The control module 238 typically implements an adaptive semi-closed loop control strategy to maintain SCR performance according to the chemical model 250, where the control module continuously learns one or more parameters associated with the chemical model 250 according to the ongoing performance of the motor vehicle 10. However, a technical challenge for an exhaust system using an adaptive control strategy is that if there exists a downstream $NO_x$ error (downstream NOx sensor vs downstream $NO_x$ modeled) that is high enough to cause a steady state slip detection event, it can cause the exhaust system to cycle in and out of steady state slip detection without any adaption. In one or more examples, the error is big enough to cause the emissions control system 34 to enter into a steady state slip detection, but not big enough to cause an adaptation when the detection process is completed. In some embodiments, the steady state condition may correspond to a condition where ICE speed or load is constant.

Figure 4:
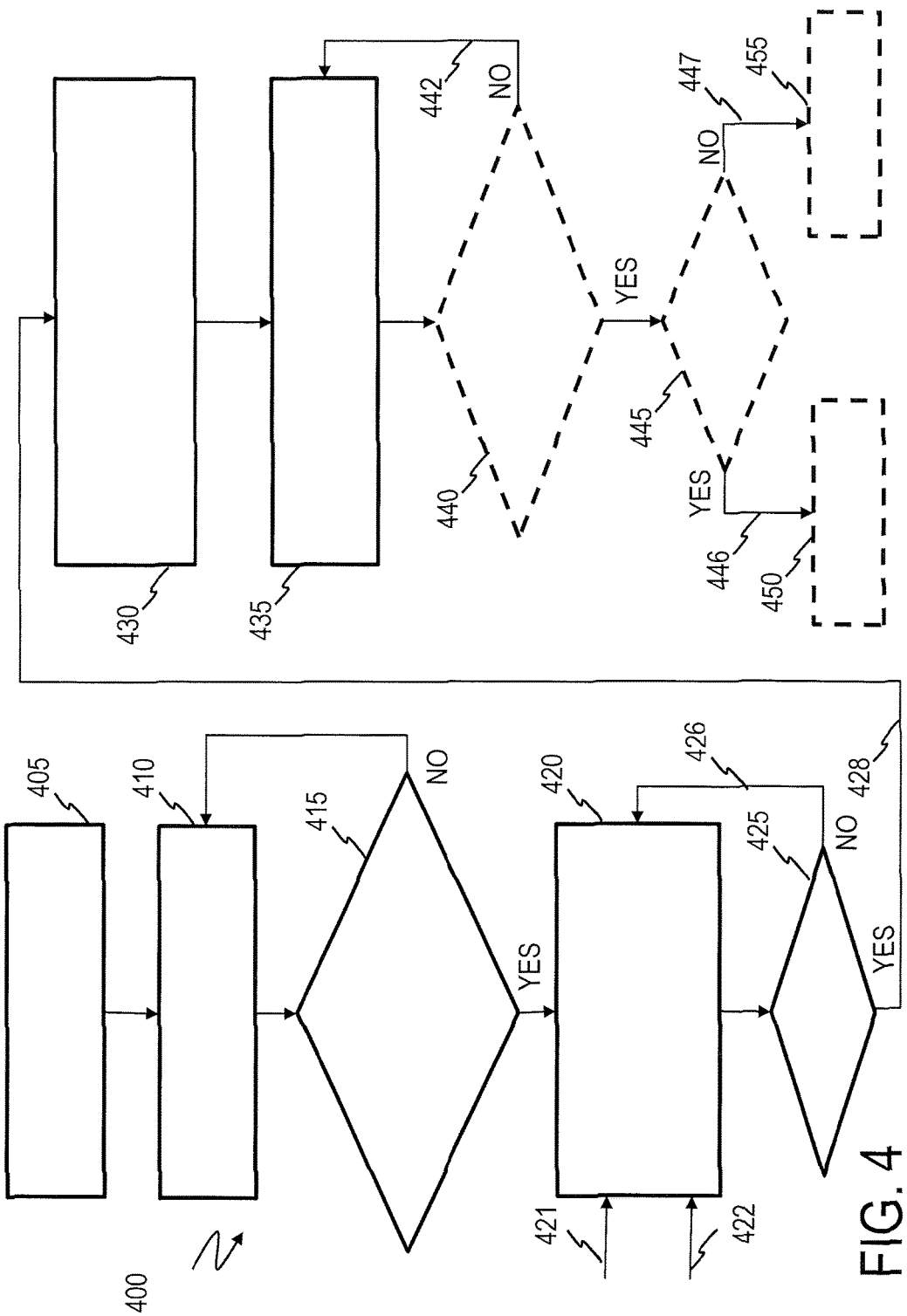
FIG. 4 illustrates a flowchart of an illustrative method for detecting ammonia slip in an SCR/SCRF device using a perturbation technique according to one or more embodiments.

FIG. 4 illustrates a flowchart of an exemplary method 400 for detecting ammonia slip in an SCR device 220 according to one or more embodiments. The method 400 is implemented by the controller 238, in one or more examples. Alternatively, the method 400 is implemented by one or more electric circuits. In one or more examples, the method 400 is implemented by execution of logic that may be provided or stored in the form of computer readable and/or executable instructions.

The method 400 includes receiving a measurement of $NO_x$ from the upstream $NO_x$ sensor 242a, and SCR device 220 temperatures from the temperatures sensor 244 as shown at 405. Further, it is checked to see if the ICE system 24 is in a preselected engine operating condition, such as a "steady state" operating condition where the $NO_x$ produced by the engine is substantially constant, as shown at process steps 410 and 415. For example, in an embodiment, a steady state operating condition may correspond to a condition where the vehicle 10 is motoring, e.g., engine speed or load is substantially constant. In one embodiment, a gradient for the SCR temperature and the $NO_x$ upstream of the SCR device 220 is measured/determined. A gradient for each of less than a selected threshold is indicative of the ICE 26 operating in a steady state condition. In an embodiment, these two gradients are scalars and dependent of the SCR catalyst performance. For example, in and embodiment, a gradient in the temperature of less than 0.5-1° C./s is employed, while a gradient in upstream $NO_x$ of less than 1-5 ppm/sec is employed. It should be appreciated, while ppm specific values or ranges have been provided to illustrate the operation of the described embodiments, other gradients and values are possible and within the breadth and scope of the claims. For example, one possible technique for steady state identification is to use a frequency analysis of the upstream NOx sensor 242a. Under engine steady state conditions, the NOx concentration remains stable and in this condition, the RMS value of the high frequencies content of the signals from the NOx 242a is low, (e.g., thresholds around 5 to 10 ppm for frequencies above 0.01 Hz.)

The method continues to detect $NH_3$ slip detection for other operating states of the ICE 26 and loop through such steps until the preselected stead state operating condition is detected, as shown at 430. If the ICE system 24 is determined to be operating in steady state, the method performs a steady state $NH_3$ slip detection for the steady state operation of the ICE system 24, as shown at 420. The steady state $NH_3$ slip detection includes computing a predicted downstream NOx value based on the chemical model 250 of the SCR device 220 as shown by 421. The predicted downstream $NO_x$ value is determined based on the semi-closed loop calculations described herein, along with one or more sensor values, such as inlet/outlet temperature, inlet/outlet pressure, and earlier $NO_x$ measurements, among others. The slip detection further includes comparing the $NO_x$ measurement from the sensor 242b as shown by 422 with the predicted downstream $NO_x$ value and/or determining the difference between the two values. The difference may be referred to as a $NO_x$ measurement error, in one or more examples.

The method further includes comparing the absolute value (i.e., magnitude) of the $NO_x$ measurement error with a threshold value, as shown at 425. If the difference is small, then the $NO_x$ emitted and that computed as emitted by the chemical model 250 correspond and further evaluation in not needed. In other words, if the magnitude of the NOx measurement error is less than (or equal to) a selected threshold the SCR device 220 is deemed to be operating without a $NH_3$ slip, and the operation continues to loop, as shown at 426. If the magnitude of the $NO_x$ measurement error is greater than the threshold the process continues to the perturbation testing of the described embodiments as depicted by line 428. Once again, it should be appreciated that the selected threshold may be a simple scalar and selected as a function of the components and configuration of the system. In one embodiment a threshold difference of 30-60 ppm/s is employed, though other values are possible.

It should be appreciated that the NOx measurement and predicted value may indicate a concentration of $NO_x$ in the exhaust gases 216. In such a case, in one or more examples, the predetermined threshold may correspond to a predetermined concentration of $NO_x$, such as 37.5 ppm (or any other value). In one or more examples, the predetermined value may be determined based on a specified a statistic such as a standard deviation, for example 1.5 standard deviation. For example, the predetermined value may be calibrated to a modeled downstream $NO_x$ value that is considered acceptable. In an embodiment, the measured downstream $_{NOx}$ is thus normalized against the expected error of the sensor. The normalized error, 1.5 in this example, is then compared to the threshold for entry into steady state slip detection logic. The predetermined value of the concentration of the $NO_x$ that is used as the threshold for comparison, in such cases, is computed based on the earlier values of the $NO_x$ measured by the $NO_x$ sensor 242b. In other words, in the above example scenario, the 37.5 ppm is used as the threshold value because 37.5 is the 1.5 standard deviation value of earlier $NO_x$ measurements. It should be noted that in one or more examples, the $NO_x$ measurement and predicted value from the chemical model 250 used may be a $NO_x$ flow rate, or any other NOx attribute (instead of the $NO_x$ concentration).

Figure 5:
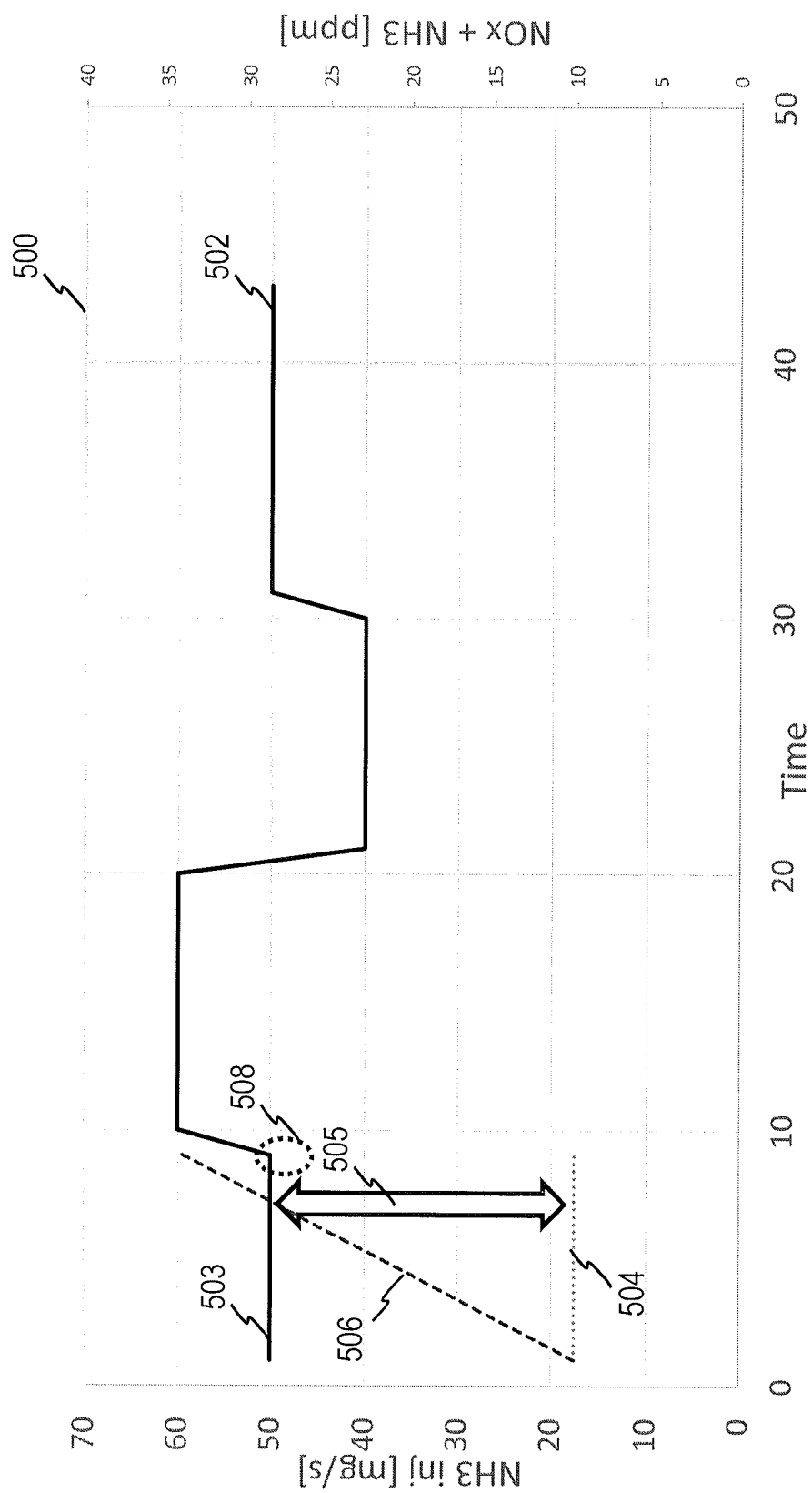
FIG. 5 illustrates a diagram of an injection perturbation in accordance with an embodiment.

Continuing with FIG. 4, and the method for detecting an $NH_3$ slip condition 400 in accordance with an embodiment. Following line 428, at process block 430, the method continues with storing the data regarding the $NO_x$ sensor information and current DEF injection employed. A perturbation input is generated and applied to the $NH_3$ injection. In an embodiment the perturbation input is substantially a single cycle of a square wave with opposite polarity peaks, also referred to as a doublet. The magnitude of the injection perturbation is percentage of the current DEF injection for the steady state operation of the emission control system 34. In an embodiment the magnitude corresponds to the stored steady state value for the DEF injection plus an increment for the first half and minus an increment for the second half. Likewise the duration for the perturbation may be selected as a calibratable depending factors and operational parameters associated with the emission control system. For example, in an embodiment, the percentage magnitude and duration of the perturbation may be a function of the steady state exhaust flow through the SCR device 220 and the temperature measured by the temperature sensor 244. It should be appreciated that in general the magnitude and duration of the perturbation should be selected to be large enough to at least exhibit a measurable effect on the response of the system sufficient for measurement, without resulting in an overall impact on the steady state operation of the emission control system 34. FIG. 5 depicts an example graph time history 500 depicting the perturbation 502 as added to the nominal DEF injection. In the figure, it can be seen that a nominal steady state dosing of 50 mg/s of $NH_3$. When the NOx model 250 value as depicted by 504 deviates as shown by arrow 505 from the NOx sensor data beyond a threshold (shown as 506). The perturbation is initiated as depicted at 508.

Continuing now with FIG. 4, with the introduction of the perturbation, as depicted at process step 435 the gradient of the NOx as measured by the downstream sensor 242b is compared with the steady state values prior to the perturbation and stored during step 430. Based on the comparison, as depicted at optional process step 440 if the amount of added $NH_3$ is not fully consumed by the catalyst in the SCR device 220 and exceeds a selected threshold, then the process is halted/reiterates as shown by line 442. In an embodiment the threshold is a function of SCR characteristics. For example, in one embodiment the threshold is a function of the temperature of the SCR device 220 as measured by the temperature sensor 244. Furthermore, the threshold may be a function of the NOx level and/or exhaust flow. In one embodiment the threshold is on the order of 0.2-2.0 g It should be appreciated, while an specific values or ranges have been provided to illustrate the operation of the described embodiments, other gradients and values are possible and within the breadth and scope of the claims.

Returning to the figure, if the NH3 consumed by the catalyst in the SCR device 220 exceeds the selected threshold, optionally, the gradient of the NOx measured from the steady state value is evaluated as depicted at process decision block 445. If the gradient exceeds another selected threshold, an NH3 slip condition is detected and identified as depicted at line 446 and process block 450. If the gradient is less than or equal to the selected threshold, then poor efficiency and thereby potentially excessive NOx is detected and identified as shown at line 447 and process block 455. In an embodiment, once again the threshold is a function of SCR characteristics. For example, in one embodiment the threshold is a function of the temperature of the SCR device 220 as measured by the temperature sensor 244. Furthermore, the threshold may be a function of the NOx level and/or exhaust flow. In one embodiment the threshold is on the order of 0.1 ppm/sec.-5.0 ppm/sec are possible It should be appreciated, while an specific values or ranges have been provided to illustrate the operation of the described embodiments, other gradients and values are possible and within the breadth and scope of the claims.

Figure 6:
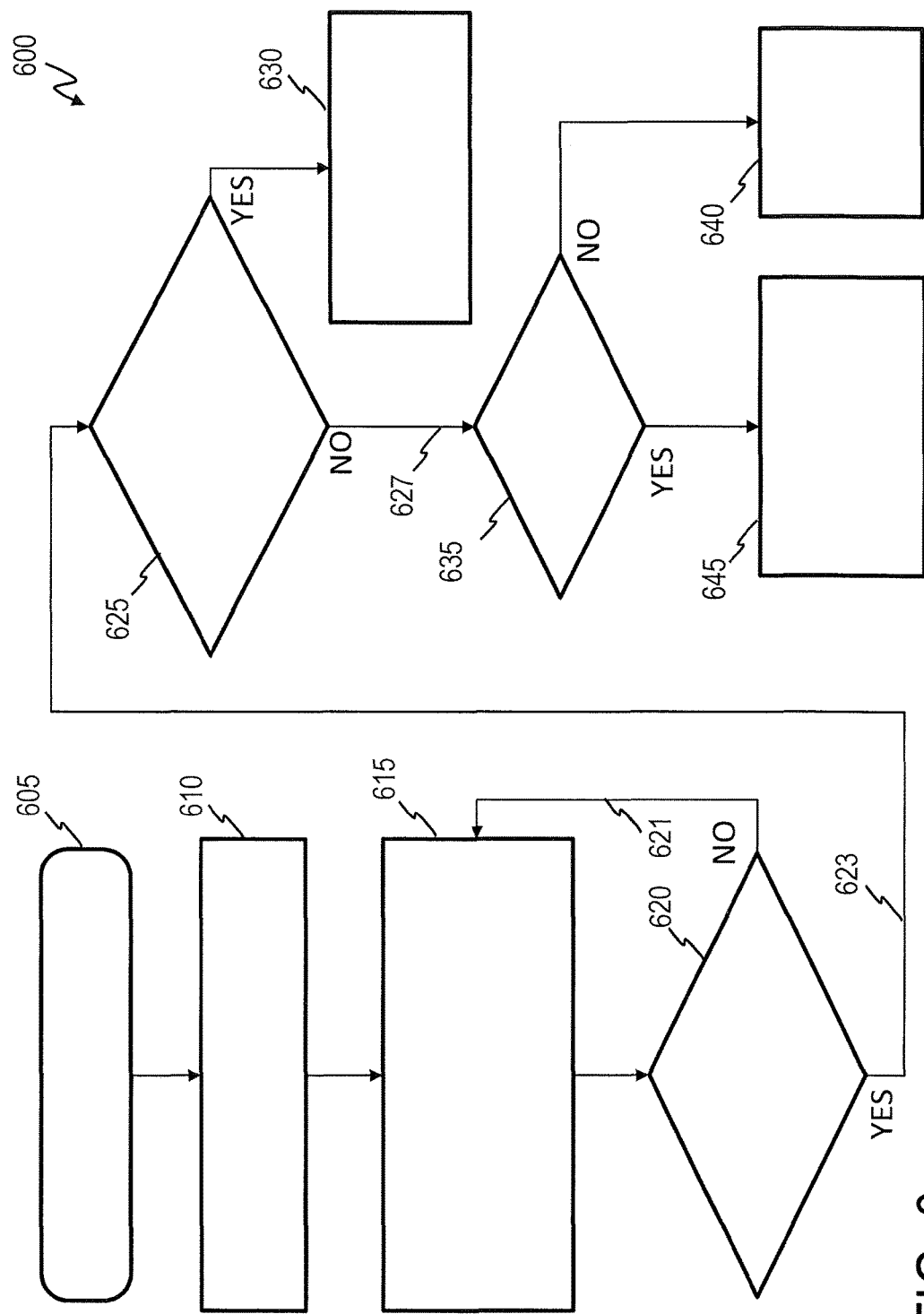
FIG. 6 illustrates a flowchart of an exemplary method for detecting ammonia slip under steady state in an UFSCR device.

FIG. 6 illustrates a flowchart of an exemplary method 600 for detecting ammonia slip under steady state in an UFSCR device 226 according to one or more embodiments. In an embodiment, the methodology 600 is implemented and performed simultaneously with the method 400 employing the perturbations as described with respect to FIGS. 4 and 5. The methodology 600 employs the disturbance resultant from the perturbation introduced in DEF injection for examining the status of the SCR device 220 to evaluate the operation of, and infer the status of, the reductant storage in the UFSCR device 226. The method 600 is also implemented by the controller 238, in one or more examples. Alternatively, the method 600 is implemented by one or more electric circuits. In one or more examples, the method 600 is implemented by execution of logic that may be provided or stored in the form of computer readable and/or executable instructions.

The method 600 initiates with verifying that the ICE 26, and more particularly that the SCR device 220 is in a preselected engine operating condition, such as a "steady state" operating condition where the $NO_x$ produced by the ICE 26 is substantially constant, as shown at process steps 605. For example, as described above, in an embodiment with respect to FIG. 4, a steady state operating condition may correspond to a condition where the vehicle 10 is motoring, e.g., engine speed or load is substantially constant and as determined at process steps 410 and 415 therein. For example as depicted at process step 415, a gradient less than a selected threshold is indicative of the ICE system 24 operating in a steady state condition. For example, once again, in and embodiment a gradient in the temperature of less than 0.5-1° C./s is employed, while a gradient in upstream NOx of less than 1-5 ppm/s is employed. It should be appreciated that while the embodiments herein have been described with respect to a particular method for determining steady state operation of the emission control system 34 and in particular the SCR device 220, other techniques are possible. For example, one possible technique for steady state identification is to use a frequency analysis of the NOx sensor 242a upstream of the SCR device 220. Under engine steady state conditions the NOx concentration remains stable and in this condition, the RMS value of the high frequencies content of the signals from the NOx 242a is low, (e.g., thresholds around 5 to 10 ppm for frequencies above 0.01 Hz)

Returning to FIG. 6, in an embodiment, the method 600 continues with receiving a measurement of $NO_x$ from the $NO_x$ sensor 242b upstream of the UFSCR device 226, and $NO_x$ sensor 242c downstream of the UFSCR device 226 as shown at 610. Concurrent with the perturbation injection as described with respect process step 430 of FIG. 4, in one embodiment a gradient with respect to the stored $NO_x$ values from process step 610 of the $NO_x$ concentration or flow as measured by the $NO_x$ sensor 242b upstream of the UFSCR device 226 (downstream of the SCR device 220) is determined. Likewise, a gradient with respect to the stored values, and the $NO_x$ sensor 242c downstream of the UFSCR device 226 (also denoted as $NO_{x3}$) is determined as depicted at process step 615.

Turning to process step 620, in an embodiment, the method continues with evaluating the state of the emission control system 34. If the steady state ammonia slip detection process for the SCR device 220 as described with respect to FIG. 4 is active including the perturbation test described therein the method waits a selected duration as the system responds. It should be appreciated that under selected operating conditions and storage levels for both the SCR device 220 and the UFSCR device 226 may result in a delay in response or notable change in $NO_x$ in the exhaust gases 216. To address this concern a selected delay or threshold is introduced. For example, in an embodiment, the delay may be a function of the steady state exhaust flow through the UFSCR device 226 and/or the temperature measured by the temperature sensor 244. For example, in operation, under low flow, low temperature conditions, a longer delay may be needed for the system response to be noted. In an embodiment the delay is selected to account for the inertia of the UFSCR device 226. In one embodiment, a delay or threshold on the order of 1-5 seconds is employed. Under other operating conditions, the response may be more rapid and little or no delay will be needed. In other words, under a low storage condition where the UFSCR device 226 has little no ability to impact the $NO_x$ conversions, the response as measured downstream of the UFSCR device 226 would exhibit little or no deviation from the NOx as measured upstream of the UFSCR device 226. Therefore, if the selected threshold delay has elapsed, then the method continues as depicted by line 623 to process step 625. If the delay has not been completed the method returns as depicted by line 621.

Continuing with process step 625, if during the particular operating conditions as determined in process step 620, i.e., steady state, DEF injection active, the gradient of the NOx as measured by the NOx sensor 242c (NOx3) downstream of the UFSCR device 226 is within a selected tolerance spread of the gradient of NOx detected by the NOx sensor 242b upstream of the UFSCR device 226 (NOx2), then it is concluded that the UFSCR 226 is operating with little or no storage capability as depicted at process block 630 the estimated storage for the model is set to zero. Conversely, if the gradient of the NOx downstream of the UFSCR device 226 (NOx3) is outside the tolerance (i.e., differs by a selected amount), of the gradient of NOx detected by the NOx sensor 242b (NOx2), then it is concluded that there is some level of emissions reduction taking place in the UFSCR device 226 and the process continues via line 627 to process block 635. The method 600 continues at process block 635 with determining if the gradient of NOx detected by the NOx sensor 242b (NOx2) exceeds a selected threshold. If the gradient is less than or equal to the selected threshold, no further action or corrections are needed, as depicted at process block 640. On the other hand, if the gradient exceeds the selected threshold, the estimated storage for the UFSCR device 226 is set to a maximum and the process continues and repeats as depicted at process block 645. In an embodiment the selected tolerance spread and selected threshold determined based of the temperature and flow of exhaust gases 216 in the UFSCR device 226. For example, the tolerance spread may be larger for lower temperature or lower flow applications. Likewise, it the temperatures are higher, or the exhaust flow is higher and smaller tolerance spread will be sufficient. Moreover, in an embodiment the threshold may be on the order of 0.1 ppm/sec to 5.0 ppm/sec. For example, the threshold may be set a smaller value for lower temperature or lower flow applications. Likewise, it the temperatures are higher, or the exhaust flow is higher a smaller threshold is sufficient. In an embodiment the threshold values may be dependent on the particular application, vehicle characteristics, SCR device characteristics, and UFSCR device characteristics and technology. As an example, values for one embodiment in one strategy to provide optimal usable conditions of the UFSCR device 226 on the order of 210-350 degrees C. of upstream temperature and 20-80 g/s of exhaust flow.

It should be appreciated that the $NO_x$ measurement and predicted value may indicate a concentration of $NO_x$ in the exhaust gases 216. In such a case, in one or more examples, the predetermined threshold may correspond to a predetermined concentration of $NO_x$, such as 37.5 ppm (or any other value). In one or more examples, the predetermined value may be determined based on a specified a statistic such as a standard deviation, for example 1.5 standard deviation. For example, the predetermined value may be calibrated to a modeled downstream $NO_x$ value that is considered acceptable. In an embodiment, the measured downstream $NO_x$ is thus normalized against the expected error of the sensor. The normalized error, 1.5 in this example, is then compared to the threshold for entry into steady state slip detection logic. The predetermined value of the concentration of the $NO_x$ that is used as the threshold for comparison, in such cases, is computed based on the earlier values of the $NO_x$ measured by the $NO_x$ sensors 242b, 242c. In other words, in the above example scenario, the 37.5 ppm is used as the threshold value because 37.5 is the 1.5 standard deviation value of earlier $NO_x$ measurements. It should be noted that in one or more examples, the $NO_x$ measurement and predicted value from the chemical model 250 used may be a $NO_x$ flow rate, or any other $NO_x$ attribute (instead of the $NO_x$ concentration).

The emission control system 34 and SCR device 220 is adapted maintain sufficient storage levels and also to prevent an $NH_3$ slip event. For example, the reductant dosing rate is adapted to achieve the desired storage and thereby ensure $NO_x$ concentration or flow rate in exhaust gas 216 downstream of the SCR device 220, to ensure the NOx emissions are controlled. Typically, the reductant dosing rate is adjusted based on the $NO_x$ measurement error. However, in some instances, in the steady state operating mode of the ICE system 24, the $NO_x$ measurement error of the same value as that observed to initiate the adaptation may not repeat, resulting in the adaptation being abandoned. This leads to the emission control system 34 to cycle in and out of steady state $NH_3$ slip detection without any adaption. In one or more examples, the $NO_x$ error is big enough to cause the emissions control system 34 to enter into the steady state slip adaptation, but not big enough to cause an adaptation when the detection process is completed. Moreover, the reductant dosing rate is adapted to achieve the desired $NO_x$ concentration or flow rate in exhaust gas 216 downstream of the UFSCR device 226, or achieve a desired $NO_x$ conversion rate.

The technical solutions described herein facilitate improvements to emissions control systems used in combustion engines, such as those used in vehicles. For example, the technical solutions determine storage correction and adaptation based on integration of a smaller error than what is used to enter a steady state $NH_3$ slip detection logic, the error indicative of a difference between downstream NOx sensor measurement and downstream $NO_x$ chemical model 250. Such improvements facilitate prevention of cycling of steady state $NH_3$ slip detection when the NOx error is just high enough to cause a steady state $NH_3$ slip detection event, but the error is low enough to cause the system to cycle in and out of the steady state NH3 slip detection without any adapts. The described embodiment provide for the detection of the slip and direct compensation for the ammonia storage as modeled within the SCR model setting it to the maximum capacity. Once the ammonia storage is corrected, the SCR control acts with the $NH_3$ storage control loop as described herein compensating the dosing and thereby compensating the $NH_3$ slip.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, such as a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance, but not limited to, a modulator/demodulator (modem; for accessing another device, system, or network), a radio frequency (RF) or other transceiver, a telephonic interface, a bridge, a router, etc.

One should note that the FIGS. 3, 4, and 6 show the architecture, functionality, and/or operation of a possible implementation of software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to illustrative embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas in a motor vehicle including an internal combustion engine, the emissions control system comprising:
   a selective catalytic reduction (SCR) device;
   an underflow selective catalytic reduction (UFSCR) device operably connected downstream of and in fluid communication with the SCR device;
   a first NOx sensor operably connected to and in fluid communication with the exhaust gas downstream of the SCR device;
   a second NOx sensor operably connected to and in fluid communication with the exhaust gas downstream of the UFSCR device;
   a controller operably connected to the SCR device, the first NOx sensor, the second NOx sensor, the controller configured to perform reductant slip detection method by:
   determining if the SCR device is in a steady state operating condition with a steady state reductant injection;
   under selected conditions, perturbing a reductant injection corresponding the steady state; the perturbation of the reductant injection having a selected magnitude and a selected duration;
   measuring a NOx value from the first NOx sensor corresponding to the steady state;
   measuring a NOx value from the second NOx sensor corresponding to the steady state;
   measuring a NOx value from the first NOx sensor resultant from the perturbing the reductant injection and computing a gradient in the NOx value resultant from the perturbing the reductant injection relative to the NOx value measured at steady state from the first NOx sensor;
   measuring the NOx value from the second NOx sensor resultant from the perturbing the reductant injection and computing a gradient in the NOx value resultant from the perturbing the reductant injection relative to the NOx value measured from the second NOx sensor at steady state;

comparing the gradient of the NOx value from the second NOx sensor resultant from the perturbing with the gradient of the NOx value from the first NOx sensor resultant from the perturbing; and if the gradient NOx value from the first NOx sensor resultant from the perturbing is within a selected range of the gradient of the NOx value from the second NOx sensor resultant from the perturbing identifying poor efficiency operation for the engine and setting an estimated reductant storage at zero, otherwise if the gradient NOx value from the second NOx sensor resultant from the perturbing exceeds a selected threshold, identifying a reductant slip condition and setting the estimated reductant storage at maximum, otherwise, making no corrections in estimated reductant storage.

2. The emissions control system of claim 1, further including a temperature sensor operably connected to and in fluid communication with the exhaust gas, the temperature sensor in operable communication with the controller.

3. The emissions control system of claim 2, further including a third NOx sensor operably connected to and in fluid communication with the exhaust gas, the third NOx disposed upstream of the SCR device and in operable communication with the controller.

4. The emissions control system of claim 3, further including the controller executing a method further including:

computing a gradient of a temperature of the SCR device and a gradient of a NOx value measured by the first NOx sensor; and comparing a steady state NOx value from the third NOx sensor with a predicted steady state NOx value.

5. The emissions control system of claim 4, wherein the selected conditions include identifying the SCR devices as at steady state if the gradient of a temperature of the SCR device is less than a third selected threshold value and a gradient of the NOx measured by the another NOx sensor is less than a fourth selected threshold value.

6. The emissions control system of claim 4, wherein the predicted NOx value is based on a chemical model of the SCR device.

7. The emissions control system of claim 4, further including the controller executing a method including, adapting a reductant dosing rate of the SCR device according to the comparing.

8. The emissions control system of claim 1, wherein the first NOx sensor is located downstream from the SCR device.

9. The emissions control system of claim 1, wherein the second NOx sensor is located downstream from the UFSCR device.

10. The emissions control system of claim 1 wherein the selected range is based on at least a temperature of the UFSCR device and a flow of the exhaust gas.

11. The emissions control system of claim 1, wherein at least one of the selected magnitude and selected duration of the perturbing a reductant injection is based on at least one of a magnitude of the steady state reductant injection, an exhaust flow and a temperature.

12. A method for treating exhaust gas emitted by an internal combustion engine, configured to perform a selective catalytic reduction (SCR) of exhaust gas in a controller operably connected to a first NOx sensor and second NOx sensor, each disposed in the exhaust gas, the controller configured to execute the method for ammonia slip detection comprising:

determining if the SCR device is in a steady state operating condition with a steady state reductant injection;

under selected conditions, perturbing a reductant injection corresponding the steady state; the perturbation of the reductant injection having a selected magnitude and a selected duration;

measuring a NOx value from the first NOx sensor corresponding to the steady state;

measuring a NOx value from the second NOx sensor corresponding to the steady state;

measuring a NOx value from the first NOx sensor resultant from the perturbing the reductant injection and computing a gradient in the NOx value resultant from the perturbing the reductant injection relative to the NOx value measured at steady state from the first NOx sensor;

measuring the NOx value from the second NOx sensor resultant from the perturbing the reductant injection and computing a gradient in the NOx value resultant from the perturbing the reductant injection relative to the NOx value measured from the second NOx sensor at steady state;

comparing the gradient of the NOx value from the second NOx sensor resultant from the perturbing with the gradient of the NOx value from the first NOx sensor resultant from the perturbing; and if the gradient NOx value from the first NOx sensor resultant from the perturbing is within a selected range of the gradient of the NOx value from the second NOx sensor resultant from the perturbing identifying poor efficiency operation for the engine and setting an estimated reductant storage at zero, otherwise if the gradient NOx value from the second NOx sensor resultant from the perturbing exceeds a selected threshold, identifying a reductant slip condition and setting the estimated reductant storage at maximum, otherwise, making no corrections in estimated reductant storage.

13. The method of claim 12, further including operably connecting a temperature sensor with the controller, the temperature sensor in fluid communication with the exhaust gas.

14. The method of claim 13, further including operably connecting a third NOx sensor with the controller, the third NOx disposed upstream of the SCR device and in fluid communication with the exhaust gas.

15. The method of claim 14, further including the controller executing a method comprising:

computing a gradient of a temperature of the SCR device and a gradient of a NOx value measured by the first NOx sensor; and comparing a steady state NOx value from the third NOx sensor with a predicted steady state NOx value.

16. The method of claim 15, wherein the selected conditions include identifying the SCR devices as at steady state if the gradient of a temperature of the SCR device is less than a third selected threshold value and a gradient of the NOx measured by the another NOx sensor is less than a fourth selected threshold value.

17. The method of claim 14, wherein the predicted NOx value is based on a chemical model of the SCR device.

18. The method of claim 12, further including the controller executing a method including, adapting a reductant dosing rate of the SCR device according to the comparing.

19. The method of claim 12, wherein at least one of the selected magnitude and selected duration of the perturbing a reductant injection is based on at least one of a magnitude of the steady state reductant injection, an exhaust flow and a temperature.

20. The method of claim 13 wherein the selected range is based on at least the temperature and a flow of the exhaust gas.

\* \* \* \* \*